(12) United States Patent
Schneider et al.

(10) Patent No.: US 7,724,927 B2
(45) Date of Patent: May 25, 2010

(54) LARGE-AREA BIOMETRIC SPECIMEN COMPARISON WITH SMALL-AREA BIOMETRIC SAMPLE

(75) Inventors: John K. Schneider, Snyder, NY (US); Fred W. Kiefer, Clarence, NY (US)

(73) Assignee: Ultra-Scan Corporation, Amherst, NY (US)

( * ) Notice: Subject to any disclaimer, the term of this patent is extended or adjusted under 35 U.S.C. 154(b) by 918 days.

(21) Appl. No.: 11/424,139

(22) Filed: Jun. 14, 2006

(65) Prior Publication Data
US 2006/0280345 A1 Dec. 14, 2006

Related U.S. Application Data

(60) Provisional application No. 60/690,380, filed on Jun. 14, 2005.

(51) Int. Cl.
*G06K 9/00* (2006.01)

(52) U.S. Cl. .............. 382/124; 340/5.83; 382/170; 382/190; 382/218; 713/159; 713/172; 713/186

(58) Field of Classification Search ............ 382/124, 382/218, 115, 116, 125, 170, 190; 340/5.83; 713/159, 172, 185, 186
See application file for complete search history.

(56) References Cited

U.S. PATENT DOCUMENTS

| | | | |
|---|---|---|---|
| 6,980,673 B2* | 12/2005 | Funahashi | 382/124 |
| 7,184,579 B2* | 2/2007 | Mizoguchi | 382/124 |
| 7,272,247 B2* | 9/2007 | Hamid | 382/124 |
| 7,359,553 B1* | 4/2008 | Wendt et al. | 382/192 |
| 7,539,331 B2* | 5/2009 | Wendt et al. | 382/124 |
| 7,574,734 B2* | 8/2009 | Fedronic et al. | 726/9 |
| 2002/0126882 A1* | 9/2002 | Funahashi | 382/124 |
| 2006/0159316 A1* | 7/2006 | Chisamore et al. | 382/125 |
| 2006/0280345 A1* | 12/2006 | Schneider et al. | 382/124 |
| 2009/0016573 A1* | 1/2009 | McAfee et al. | 382/115 |

* cited by examiner

*Primary Examiner*—Gregory M Desire
(74) *Attorney, Agent, or Firm*—Hodgson Russ LLP

(57) ABSTRACT

Methods and systems according to the invention may compare a large-area biometric specimen and a small-area biometric sample. For example, a large-area plain surface fingerprint image may be stored in a fingerprint database as a specimen, and then a small-area plain surface fingerprint image may be acquired as a sample. The small-area image sample may be submitted to a fingerprint matching system for comparison with a large-area image specimen from the database. A determination may be made as to whether the small-area image matches a portion of the large-area image.

8 Claims, 3 Drawing Sheets

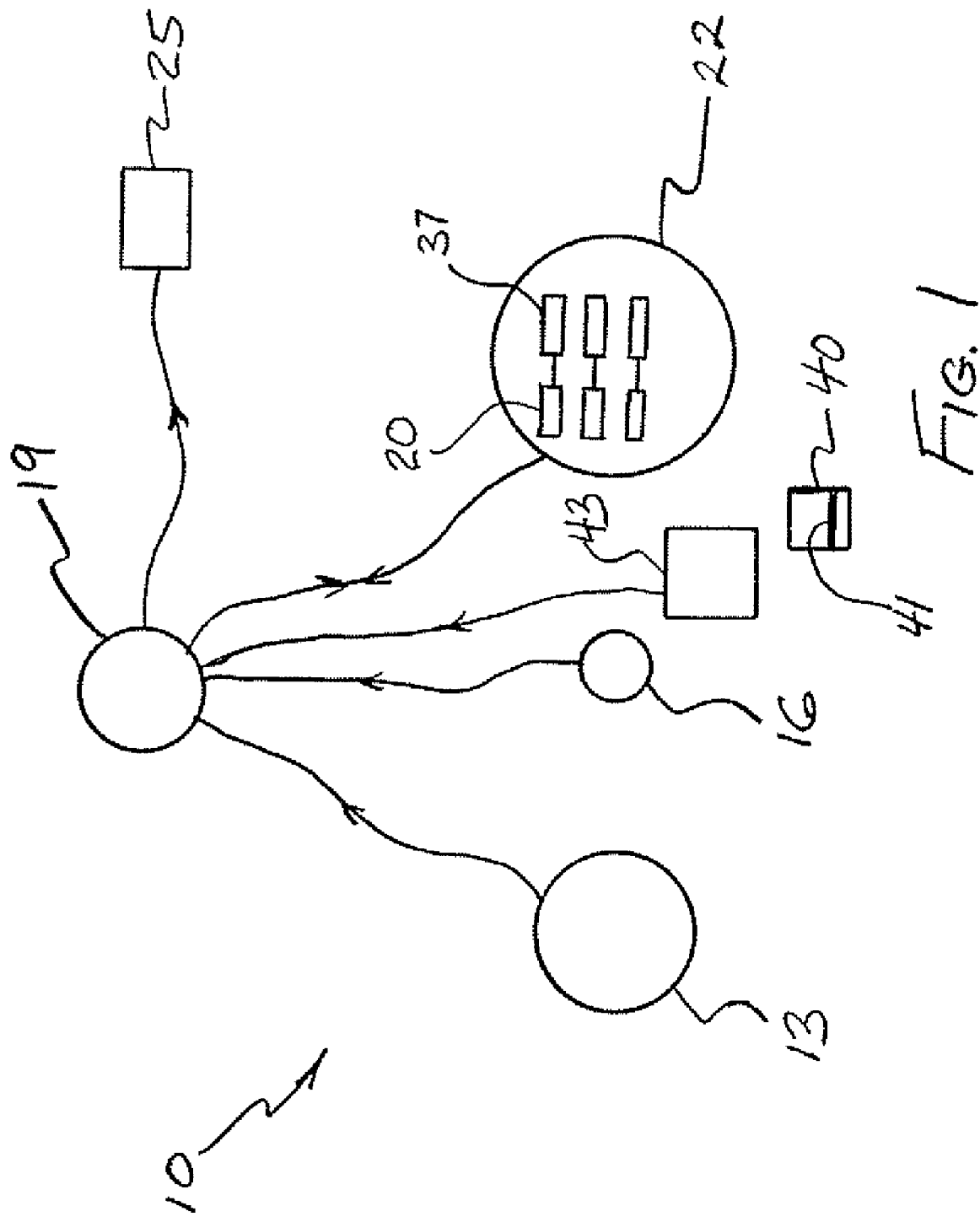

LARGE-AREA BIOMETRIC SPECIMEN COMPARISON WITH SMALL-AREA BIOMETRIC SAMPLE

CROSS-REFERENCE TO RELATED APPLICATION

This application claims the benefit of priority to U.S. provisional patent application Ser. No. 60/690,380, filed on Jun. 14, 2005.

FIELD OF THE INVENTION

The present invention relates to biometric matching techniques.

BACKGROUND OF THE INVENTION

Biometric identification systems, such as fingerprint identification systems have been available for many years. They work well and are quite reliable when used properly. The ability of a fingerprint identification system to correctly match a fingerprint sample to a pre-enrolled fingerprint specimen stored in a biometrics database is directly proportional to the size of the fingerprint specimen within the database and its correlation with a submitted fingerprint sample.

A problem exists when using fingerprint identification systems where the enrolled fingerprint images or feature extracted representations are used for comparison with live scan plain impression fingerprint images submitted to the database system for a comparison match. Frequently, the submitted sample fingerprint image, although rich in feature detail, fails to be matched or recognized because the finger was not properly oriented on the imaging platen during the image capture process, or in the case of a small-area fingerprint scanner, the imaged area of the finger was not exactly the same as the area that was imaged to produce the fingerprint specimen that is stored in the database. In some situations, the finger may have been tilted to the side or may have been presented on the extreme fingertip end. The match request fails in these circumstances, not because of lack of detail, but because the detail does not represent the same surface of the finger as that which was originally enrolled in the database.

SUMMARY OF THE INVENTION

Methods and systems according to the invention may make a comparison between large-area biometric specimens and small-area biometric samples. For example, a large-area plain surface fingerprint image may be stored in a fingerprint database as a specimen, and then a small-area fingerprint image may be acquired as a sample. The small-area image sample may be submitted to a fingerprint matching system for evaluation and comparison with an image from the database. A determination may be made as to whether the small-area image matches a portion of the large-area image.

Systems and methods according to the invention may be more cost effective. Large-area biometric imaging equipment is usually expensive, whereas, small-area biometric imaging equipment is less expensive. By using a relatively small number of large-area biometric imaging devices for enrollment purposes, and a relatively large number of small-area biometric imaging devices for authorization purposes, the cost of a biometric authorization system may be reduced. This disclosure teaches a method that allows a mix of biometric acquisition equipment so that in a given deployment of a biometric identification system, only a few expensive large-area scanners are needed, while allowing the deployment of a larger number of less expensive, small-area imaging scanners.

BRIEF DESCRIPTION OF THE DRAWINGS

For a fuller understanding of the nature and objects of the invention, reference should be made to the accompanying drawings and the subsequent description. Briefly, the drawings are:

FIG. 1, which is a schematic of a system according to the invention;

FURTHER DESCRIPTION OF THE INVENTION

Figure 2C:
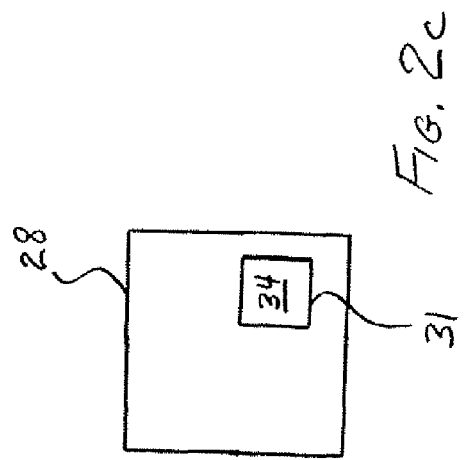
FIGS. 2a, 2b and 2c, which are graphical representations of a first area biometric specimen and a second area biometric sample.

The invention may be embodied as a biometric matching system 10, which may be part of an authorization system. One such system 10 includes a large-area biometric reader ("LABR") 13, a small-area biometric reader ("SABR") 16 and a computer 19. The LABR 13 may be capable of obtaining a biometric specimen 20, and sending the specimen 20 to a database 22 during an enrollment process. The LABR 13 may be a high-resolution large-area ultrasonic fingerprint scanner. The specimen may be a representation of a first area of an object, such as part of a human. For example, the specimen 20 may be information relating to a fingerprint. Such information may, but need not, be the type of information that can be used to create an image of a fingerprint on a monitor.

The SABR 16 may be capable of obtaining a biometric sample, and sending the sample to the computer 19, where the sample may be compared to the specimen. The SABR 16 may be a small-area ultrasonic fingerprint scanner. The sample may be a representation of a second area of the object, such as part of a human. For example, the sample may be information relating to a fingerprint. Such information may, but need not, be the type of information that can be used to create an image of a fingerprint on a monitor.

The first area of the object is larger than the second area of the object. It is believed that systems and methods according to the invention will function efficiently if the first area is two to ten (or more) times as large as the second area. For example, the first area may be approximately 0.63 inches by 0.75 inches and the second area may be 0.20 inches by 0.20 inches. When the first area and the second area are from the same object, the first area may include the second area.

The computer 19 may be in communication with the LABR 13 and the SABR 16. The computer 19 may have software running thereon which is capable of (a) making a comparison between the large-area specimen and the small-area sample, (b) determining whether the sample matches a portion of the specimen, and (c) providing a signal indicating whether a match was determined between the sample and the portion of the specimen. For example, if a match between the specimen and the sample is not determined by the computer 19, then the computer may provide a message to a monitor 25 that indicates that a match was not found. However, if a match is found between the specimen and the sample, then the computer 19 may provide a message to the monitor 25 that indicates that a match was found.

Figure 2B:
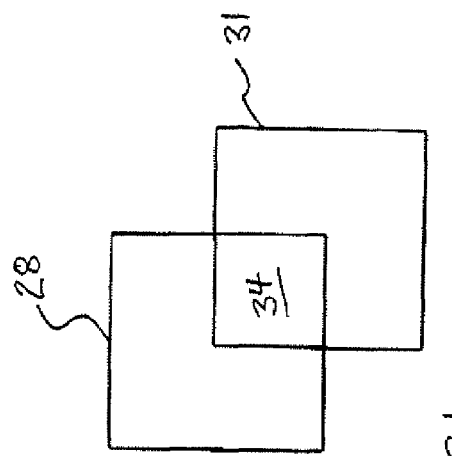
Figure 2A:
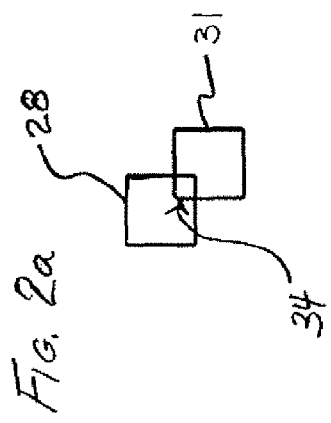
Figure 3:
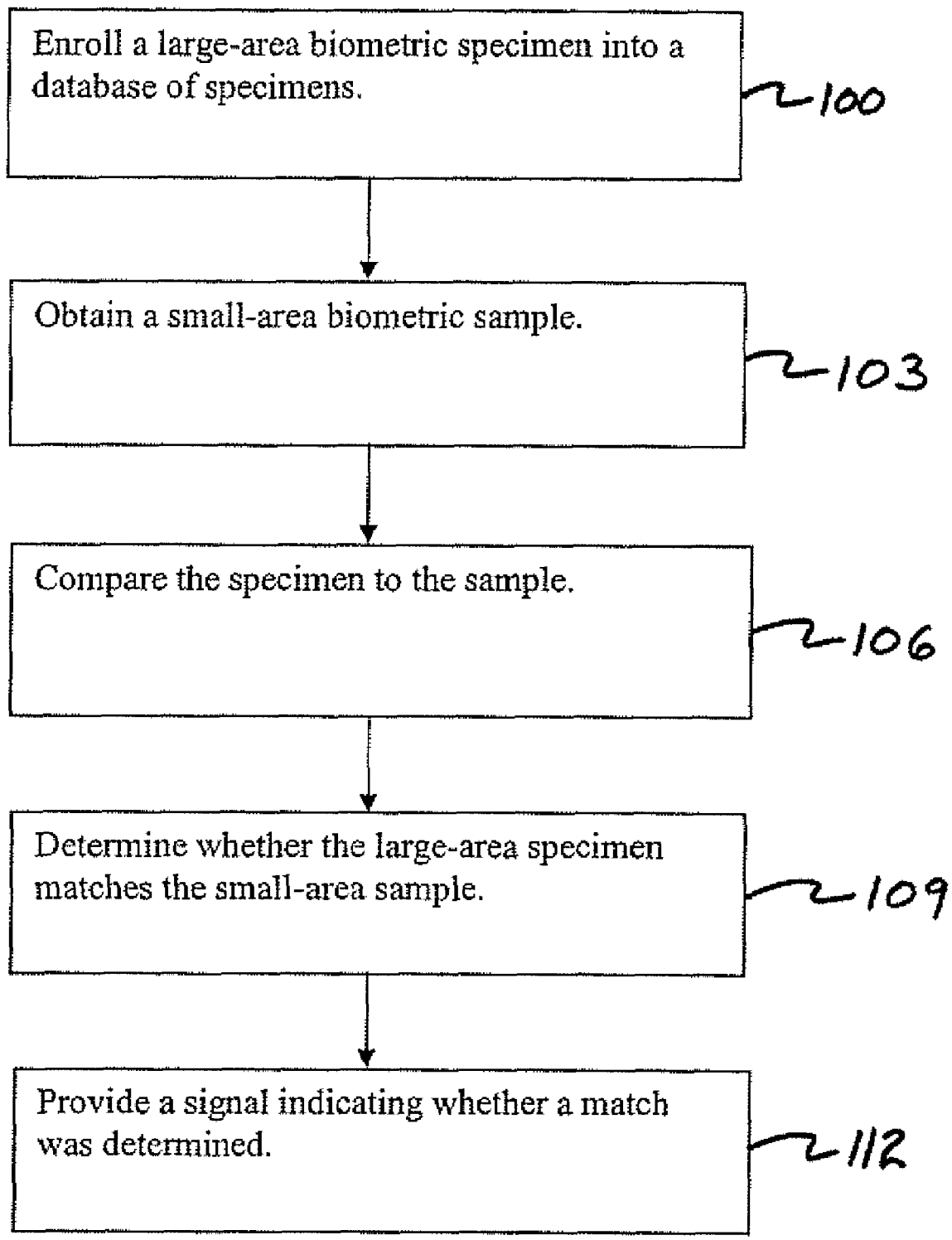
FIG. 3, which illustrates a method according to the invention.

FIGS. 2a, 2b and 2c graphically depict the image areas for three systems. In FIGS. 2a, 2b and 2c, the first area 28 and the second area 31 are graphically depicted as rectangles. In FIG.

2*a*, an SABR is used for enrolling a biometric specimen in the database and an SABR is used to provide the biometric sample. In FIG. 2*b*, an LABR is used for enrolling a biometric specimen in the database and an LABR is used to provide the biometric sample. Finally, in keeping with the invention, FIG. 2*c* depicts a system in which an LABR 13 is used for enrolling a biometric specimen 20 in the database 22 and an SABR 16 is used to provide the biometric sample.

If it is assumed that the small-area rectangles corresponding to the SABR contain sufficient information to properly make a match with a specimen stored in a database, then it may be that the matching process which uses an SABR is primarily dependent on proper finger placement. For example, FIG. 2*a* depicts the situation in which a matching process uses a small-area specimen and a small-area sample. In such a matching process, it is possible that a very small area of overlap 34 between the first area 28 and the second area 31 will result if the finger is located on the enrollment SABR (to provide the specimen) in a manner that is different from how the finger is located on the SABR that is used to provide the sample. It is likely that the area of overlap 34 may not contain enough information for a match to be determined, even though the specimen and the sample come from the same finger, thereby resulting in a false rejection when the matching process is carried out. Consequently, although a system that uses only SABRs may be inexpensive, such a system is likely to result in many situations where no match is found when in fact a match should be found.

FIG. 2*b* depicts the situation in which a matching process uses a large-area specimen and a large-area sample. In such a matching process, the area of overlap 34 is likely to be larger than in the process illustrated in FIG. 2*a*, even when the finger is located on the LABR (during enrollment to provide the specimen) in a different manner than when the finger is located on the LABR (during authorization to provide the sample). Although the area of overlap 34 is likely to contain enough information for a match to be correctly determined, a system that uses only LABRs may be expensive.

FIG. 2*c* depicts the situation in which a matching process uses a large-area specimen 20 and a small-area sample. In such a matching process, as long as an adequate amount of the small-area sample is also in the large-area specimen 20, there should be enough information in the overlap area 34 to correctly determine whether a match exists between the specimen 20 and the sample. If the enrolled specimen 20 stored in the database 22 is much larger in area than that of the sample, there is substantially less likelihood of a situation where the submitted sample is not adequately contained within the enrolled image specimen 20. Consequently, in a system that uses a large-area specimen 20 and a small-area sample for comparison purposes, fewer LABRs 13 and more SABRs 16 may be used to provide a matching system 10 that is likely to avoid the false rejection problem identified with regard to FIG. 2*a*, but such a system 10 will be less expensive when compared to a system according to FIG. 2*b*.

The database 22 in which specimens 20 may be stored may contain a large number of specimens 20. In order to expedite use of the system, some (or all) of the specimens 20 may be linked with a piece of identification information 37, such as a social-security number. Then, when the biometric sample is obtained by the SABR 16, the user of the SABR 16 may be prompted to enter the identification information 37. Upon receiving the identification information 37, the database 22 may be quickly searched using the identification information 37 to locate a matching piece of identification information 37. Once a matching piece of identification information 37 is located, the linked biometric specimen 20 may be retrieved and used to determine whether a match exists between the sample and the retrieved specimen 20.

The identification information 37 provided by the user of the SABR 16 may be carried on a token 40, such as a plastic card. Such a token 40 may include a magnetic strip 41 on which the identification information 37 is recorded. To provide the identification information 37 from the token 40, the user may swipe the card through a token reader 43. The token reader 43 may read the identification information 37 from the token 40, and send that information 37 to the computer 19. Other examples of tokens 40 that may be used with the invention include a driver's license or passport, which may be used to establish the identity of the user submitting the fingerprint specimen and/or sample.

In a method according to the invention, a biometric sample is compared to a biometric specimen. In one such method, an LABR is used to enroll 100 a biometric specimen, the specimen being a representation of a first area of an object. An SABR may be used to obtain 103 a biometric sample, the sample being a representation of a second area of an object, the first area being larger than the second area. The small-area sample may be compared 106 to the large-area specimen. Then it may be determined 109 whether the sample matches a portion of the specimen. A signal may be provided 112 to indicate whether a match was determined 109 between the sample and the portion of the specimen.

It is contemplated that in a particular method according to the invention, the biometric specimen may be stored in a database prior to using the SABR to obtain the biometric sample. Then, as part of an attempt to determine whether a match exists, the stored biometric specimen may be retrieved from the database prior to comparing the small-area sample to the large-area specimen. Since the database may contain a large number of specimens, the biometric specimen may be linked to identification information. In that situation, a user of the SABR may be prompted to provide the identification information, and the database may be searched for a matching piece of identification information. If the identification information in the database is matched to the identification information provided by the user of the SABR, the linked biometric specimen may be retrieved for comparison with the biometric sample. To provide the identification information, the user may be prompted to provide a token such as a card having the identification information encoded thereon, and the user may swipe the card through a card reader. As the card is swiped, the card reader may read the identification information from the card and send that information to a computer for use in locating the corresponding biometric specimen.

Systems and methods according to the invention may be used as part of a transaction authorization process. If a match between the specimen and the sample is determined, then a transaction may be authorized. For example, if the user of the SABR desires to purchase goods from a retailer, a system and method according to the invention may be used to determine whether the retailer should accept a personal check from the user of the SABR.

It will be recognized that the invention may be used to determine matches between specimens and samples in situations where the sample was captured in a non-optimal manner. For example, if the SABR user provides his finger in an orientation that does not match the orientation used in providing the specimen, a match may be nevertheless determined, provided that the second area (corresponding to the sample) is adequately within the first area (corresponding to the specimen) such that the overlapping area contains enough information to determine that the sample and the specimen originate from the same body part. So if the SABR user provides the tip or side of his finger, or tilts his finger, rather than providing a sample corresponding to the customary center-portion of the finger, a match may nevertheless be determined.

One benefit of the invention is that the cost of a biometric authorization system may be reduced. Since deployment of an identification system in an enterprise (e.g. store, hospital, chain of stores, etc.) may involve the deployment of a large number of biometric scanners, it is economically desirable to deploy a maximum number of less expensive SABRs and a minimum number of more expensive LABRs. The invention permits this to occur.

It should be noted that the system and the method were illustrated herein using fingerprint readers and fingerprints. The invention is not limited to fingerprint readers and fingerprints. Other biometrics may be used, including retina scans, hand shape, facial geometry and many other types of biometrics.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of comparing a biometric sample to a biometric specimen, comprising:
    using a large-area biometric reader to enroll a biometric specimen into a database, the specimen being a representation of a first area of an object;
    using a small-area biometric reader to obtain a biometric sample, the sample being a representation of a second area of an object, the first area being larger than the second area;
    providing an information token having stored thereon identification information, and
    reading the identification information from the token;
    using the identification information to locate a corresponding biometric specimen in the database; and
    retrieving the corresponding biometric specimen from the database;
    comparing the sample and the retrieved specimen;
    determining whether the sample matches a portion of the retrieved specimen; and
    providing a signal indicating whether a match was determined between the sample and the portion of the retrieved specimen.

2. The method of claim 1, wherein the specimen and the sample are fingerprints.

3. The method of claim 1, wherein the biometric readers are fingerprint scanners.

4. The method of claim 1, wherein the first area is at least twice the size of the second area.

5. A biometric matching system, comprising:
    a large-area biometric reader ("LABR") capable of being used to enroll a biometric specimen, the specimen being a representation of a first area of an object;
    a small-area biometric reader ("SABR") capable of being used to provide a biometric sample, the sample being a representation of a second area of an object, the first area being larger than the second area;
    a database having stored therein biometric specimens from many objects, wherein at least some of the specimens are each linked to identification information;
    a token having thereon identification information that may be used to identify the specimen that should be compared to the sample; and
    a computer, in communication with the LABR and the SABR, and having software running thereon which is capable of (a) receiving identification information from the token, (b) using the identification information to locate a corresponding biometric specimen in the database, (c) retrieving the corresponding biometric specimen; (d) making a comparison between the retrieved specimen and the sample, (e) determining whether the sample matches a portion of the retrieved specimen, and (f) providing a signal indicating whether a match was determined between the sample and the portion of the retrieved specimen.

6. The system of claim 5, wherein the specimen and the sample are fingerprints.

7. The system of claim 5, wherein the biometric readers are fingerprint scanners.

8. The system of claim 5, wherein the first area is at least twice the size of the second area.

* * * * *